(12) United States Patent
Gamberini (10) Patent No.: US 9,441,608 B2
(45) Date of Patent: Sep. 13, 2016

(54) WIND TURBINE

(75) Inventor: Enzo Gamberini, Zola Predosa (Bologna) (IT)

(73) Assignee: COMET—S.R.L., Crespellano (Bologna) (IT)

( * ) Notice: Subject to any disclaimer, the term of this patent is extended or adjusted under 35 U.S.C. 154(b) by 945 days.

(21) Appl. No.: 13/387,368

(22) PCT Filed: Feb. 10, 2010

(86) PCT No.: PCT/EP2010/051650
§ 371 (c)(1),
(2), (4) Date: Apr. 10, 2012

(87) PCT Pub. No.: WO2011/012334
PCT Pub. Date: Feb. 3, 2011

(65) Prior Publication Data
US 2012/0189428 A1    Jul. 26, 2012

(30) Foreign Application Priority Data
Jul. 28, 2009   (IT) .............................. RE2009A0077

(51) Int. Cl.
*F03D 3/04* (2006.01)

(52) U.S. Cl.
CPC ............. *F03D 3/0427* (2013.01); *F03D 3/049* (2013.01); *F05B 2240/133* (2013.01); *F05B 2240/14* (2013.01); *F05B 2240/213* (2013.01); *F05B 2240/214* (2013.01); *Y02E 10/74* (2013.01)

(58) Field of Classification Search
CPC ................ F03D 3/0427; F03D 3/049; F05B 2240/133; F05B 2240/14; F05B 2240/214; F05B 2240/213; Y02E 10/74

USPC ........... 415/4.2, 4.4, 224; 416/9; 290/44, 55
See application file for complete search history.

(56) References Cited

U.S. PATENT DOCUMENTS

| | | | | |
|---|---|---|---|---|
| 2,746 | A * | 8/1842 | Grew | 415/4.2 |
| 14,997 | A * | 6/1856 | Battey | 415/4.2 |
| 45,273 | A * | 11/1864 | Reister | 415/4.2 |
| 171,962 | A * | 1/1876 | Stephens et al. | 415/4.1 |
| 201,400 | A * | 3/1878 | Everhart | 415/4.4 |
| 264,164 | A * | 9/1882 | Jackson | 415/2.1 |
| 313,646 | A * | 3/1885 | Bausman | 415/4.2 |
| 381,679 | A * | 4/1888 | Devereux | 415/4.4 |
| 993,120 | A | 5/1911 | Sterner | |

(Continued)

FOREIGN PATENT DOCUMENTS

| DE | 202007004034 U1 | 5/2007 |
|---|---|---|
| EP | 1925819 A1 | 5/2008 |

OTHER PUBLICATIONS

Freimund, English Machine Translation of DE202007004034, May 24, 2007, Translated by epacenet Nov. 24, 2014.*

*Primary Examiner* — Craig Kim
*Assistant Examiner* — Wayne A Lambert
(74) *Attorney, Agent, or Firm* — Volpe and Koenig, P.C.

(57) ABSTRACT

A wind turbine device comprising a base frame which supports a vertical axis wind operated rotor, the axis being associated to a user device and being contained in a matchingly-dimensioned cylindrical casing exhibiting two openings, respectively an inlet and an outlet, aligned perpendicular to the rotor axis, the casing being driven to rotate about the axis by a member sensitive to the direction of the wind, such that the inlet opening is always facing into the wind.

10 Claims, 11 Drawing Sheets

(56) References Cited

U.S. PATENT DOCUMENTS

| | | | |
|---|---|---|---|
| 1,025,428 A * | 5/1912 | Stanschus | 415/4.3 |
| 1,225,033 A * | 5/1917 | Jackson | 415/141 |
| 1,471,095 A * | 10/1923 | Bonetto | 415/4.4 |
| 1,835,018 A * | 12/1931 | Darrieus | 415/224 |
| 2,942,773 A * | 6/1960 | Eck | 415/224 |
| 3,883,261 A * | 5/1975 | Saxmann | 415/7 |
| 3,883,750 A * | 5/1975 | Uzzell, Jr. | 290/55 |
| 3,902,072 A * | 8/1975 | Quinn | 290/44 |
| 3,944,840 A * | 3/1976 | Troll | 290/55 |
| 4,031,405 A * | 6/1977 | Asperger | 290/55 |
| 4,084,918 A * | 4/1978 | Pavlecka | 415/1 |
| 4,164,382 A * | 8/1979 | Mysels | 415/4.4 |
| 4,174,923 A * | 11/1979 | Williamson | 415/211.1 |
| 4,260,325 A * | 4/1981 | Cymara | 415/4.4 |
| 4,279,569 A * | 7/1981 | Harloff | 415/53.3 |
| 4,295,783 A * | 10/1981 | Lebost | 415/4.4 |
| 4,834,610 A * | 5/1989 | Bond, III | 415/53.3 |
| 4,872,804 A * | 10/1989 | Teles De Menezes | 415/2.1 |
| 5,009,569 A * | 4/1991 | Hector et al. | 415/4.1 |
| 5,088,884 A * | 2/1992 | Bergstein | 415/3.1 |
| 5,332,354 A * | 7/1994 | Lamont | 415/4.2 |
| 6,191,496 B1 * | 2/2001 | Elder | 290/55 |
| 6,710,468 B1 * | 3/2004 | Marrero O'Shanahan | 290/55 |
| 6,981,839 B2 * | 1/2006 | Fan | 415/4.1 |
| 7,056,082 B1 * | 6/2006 | Taylor | 415/4.2 |
| 7,484,363 B2 * | 2/2009 | Reidy et al. | 60/398 |
| 8,154,145 B2 * | 4/2012 | Krauss | 290/54 |
| 2001/0004439 A1 * | 6/2001 | Bolcich et al. | 416/9 |
| 2003/0133782 A1 | 7/2003 | Holter et al. | |
| 2003/0133783 A1 * | 7/2003 | Brock et al. | 415/4.2 |
| 2007/0098542 A1 * | 5/2007 | Streeman et al. | 415/4.2 |
| 2009/0045632 A1 * | 2/2009 | Krauss | 290/54 |

\* cited by examiner

WIND TURBINE

TECHNICAL FIELD

The present invention is a wind turbine designed to transform wind energy into mechanical energy.

BACKGROUND ART

The use of turbines designed to transform wind energy into mechanical energy is well known, such devices generally being arranged in arrays comprising a significant number of turbines erected in particularly windy locations.

Generators of known type usually comprise a frame designed to rotatingly support fluid-dynamic means destined to capture the wind, the fluid-dynamic means being connected by a mechanical transmission to a user device, for example a generator of electrical current.

The kinetic energy of the air is generally converted into mechanical energy and subsequently into electrical energy using aerogenerators.

Installations range comprises from mini- and micro-scale wind turbines which give an output of from a few hundred Watts to tens of kW of power, to medium sized installations rendering up to about a hundred kW, and finally to large scale systems which can produce an output measured in MW.

Horizontal axis machines of known type exhibit a rotor axis parallel to the direction of the wind and a rotor which rotates on a plane perpendicular to the direction of the wind.

Such devices can be further sub-categorized according to the characteristics of the rotor.

While numerous variants exist, the typical rotor is normally characterized by a wing shaped radial blades.

The special characteristics of the machine are high rotational speed and high power output as a consequence of the high lift coefficient of the blades.

Also known are vertical axis machines exhibiting a rotor axis that is placed perpendicular to the direction of the wind.

Again these can be sub-categorized on the basis of the rotor type used.

In this specific configuration the turbine exhibits the considerable advantage of not needing to orientate itself relative to the direction of the wind, which can thus be exploited around 360° of rotation without auxiliary movements. In contrast, the rotor of horizontal axis machines must be guided to face the direction of the wind using a vane.

Vertical-axis machines are of limited dimensions and are more suited to urban wind patterns which are normally turbulent, extremely variable in direction and strength, and consequently badly suited to horizontal axis turbines.

Vertical axis turbines are also suitable for use in very remote locations characterized by extreme climactic conditions including the formation of ice and intense, variable wind patterns.

Generators of known type exhibit a number of disadvantages which to date have not been successfully resolved.

A first disadvantage is aesthetic, since in order to provide an acceptable level of power wind turbines must be arranged in arrays or "farms" comprising a considerable number of turbines.

Wind farms must be positioned in windy areas and unavoidably compromise landscape which is often of considerable environmental relevance, and their construction is understandably opposed by local authorities.

Environmental impact is worsened by the fact that the air currents required to turn the fluid-dynamic means of the turbines are generally found at a significant height above ground, making it necessary to construct turbines of a considerable height.

An efficient height is thought to be at least 6 meters above ground level in order to achieve acceptable results.

A second disadvantage, technical in nature, is the limited yield of known fluid-dynamic means which are efficient only if the wind speed is above approximately 6 m/sec., a velocity that is rarely encountered in proximity to urban areas, and consequently any generated electricity is subject to significant transport costs.

Consequently there is an obvious need for a wind turbine, of limited bulk in both the horizontal and vertical profiles, that can operate with wind at a lower speed than that required to drive generators of known type while providing a comparatively higher energy yield.

DISCLOSURE OF INVENTION

The aim of the present invention is to provide a wind turbine that satisfies these requirements, is simple in shape, exhibits limited overall dimensions, and produces a high fluid-dynamic yield.

This aim is attained by a generator exhibiting the characteristics recited in the independent claim.

The dependent claims describe characteristics that improve the performance of the invention.

BRIEF DESCRIPTION OF DRAWINGS

The advantages and constructional and functional characteristics of the invention will better emerge from the detailed description made herein, which in the accompanying figures of the drawings describes a preferred embodiment of the invention, provided by way of non-limiting examples.

BEST MODE FOR CARRYING OUT THE INVENTION

The first embodiment of FIGS. 1 to 7 comprises a base frame 1 superiorly supporting a plate 10 from which a series of peripheral brackets 11 extend upwards.

The brackets 11 support a circular ring 12, on which pairs of idle wheels 13 run, supported by brackets 14 extending from a lower circular edge of a cylindrical casing 15, the casing 15 thus being free to rotate around an axis thereof.

Fitted at the bottom of the casing is a circular rack 16 exhibiting internal teeth enmeshing with a pinion 17 of an electrical motor 18 solidly fitted to the plate 10.

The rotation of the casing 15 is thus controlled by the motor 18 in a way that will be explained herein below.

The plate 10 is fitted with a central hub 19 (FIGS. 4 and 6) which supports a shaft 22 by way of suitable bearings 20 and 21.

Figure 4:
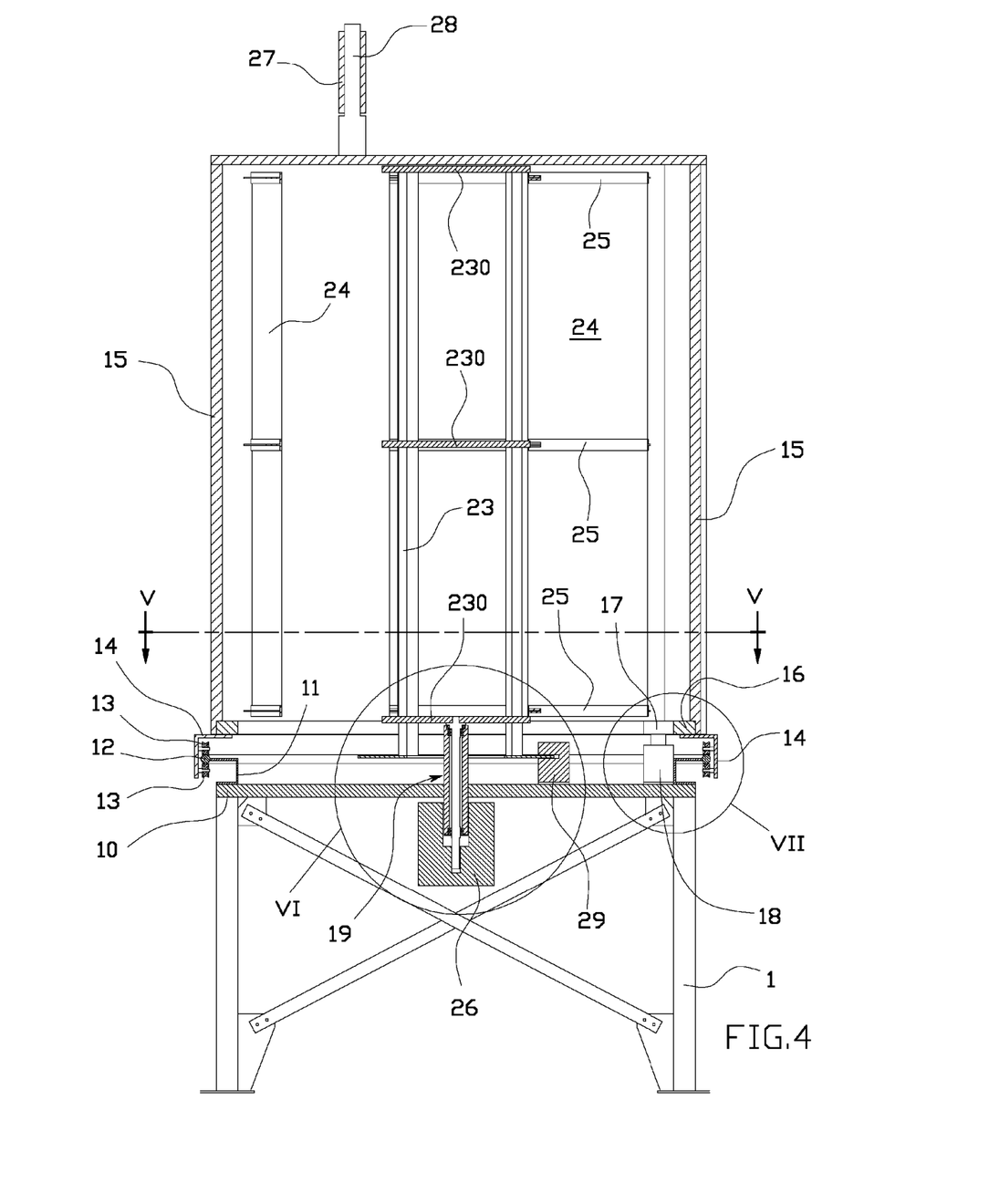
FIG. 4 is a cross-section IV-IV of FIG. 3.

The shaft 22 supports, above the plate 10, a cage 23 reinforced with plates 230, from which three profiled blades 24 are formed of matching concavity.

In particular each blade 24 is supported by three curved brackets 25 associated to the cage 23.

The lower extremity of the shaft 22 is splined to the rotor, not illustrated, of an electrical generator 26, which can be of synchronous or asynchronous type.

The cylindrical casing 15 exhibits two openings 151 and 152 (FIGS. 3 and 5) located on the same side of the cage 23.

Figure 3:
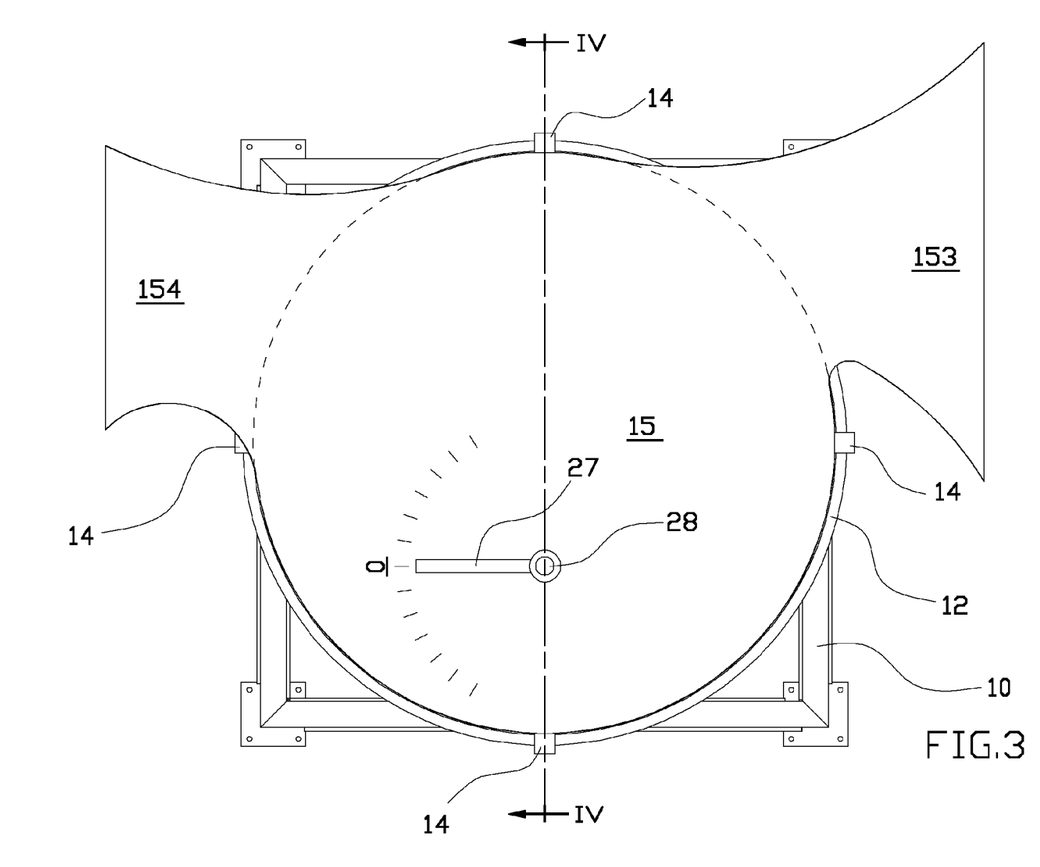
FIG. 3 is a plan view of the device.
Figure 5:
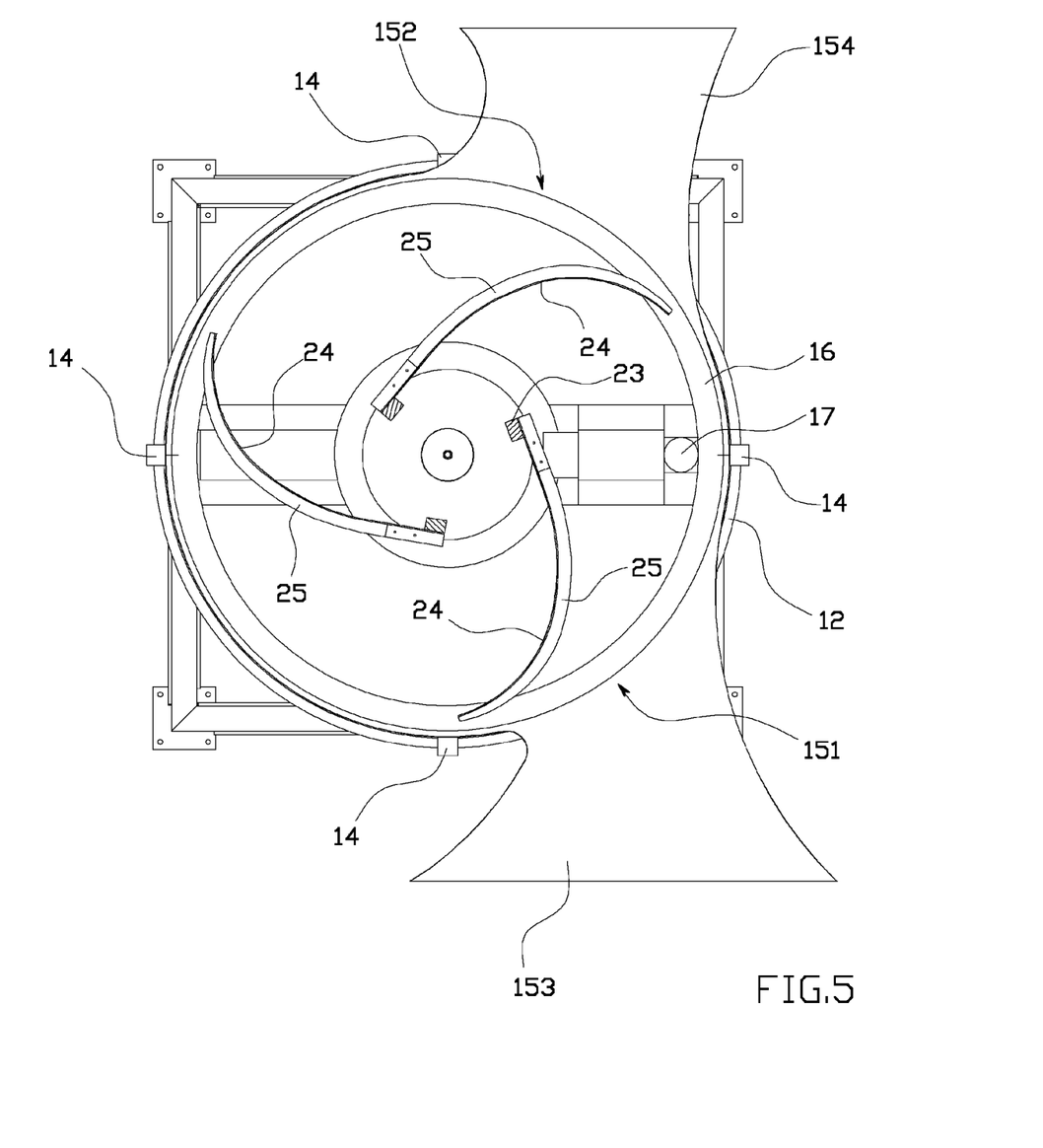
FIG. 5 is a cross-section V-V of FIG. 4.

The opening 151 is in communication with a divergent duct 153, while the casing 152 is in communication with another divergent duct 154.

Both the ducts are divergent in the direction they project away from the casing 15.

The space between the two openings 151 and 152 is entirely occupied by at least one of the blades 24, the concavity of which faces towards the opening 151.

Figure 1:
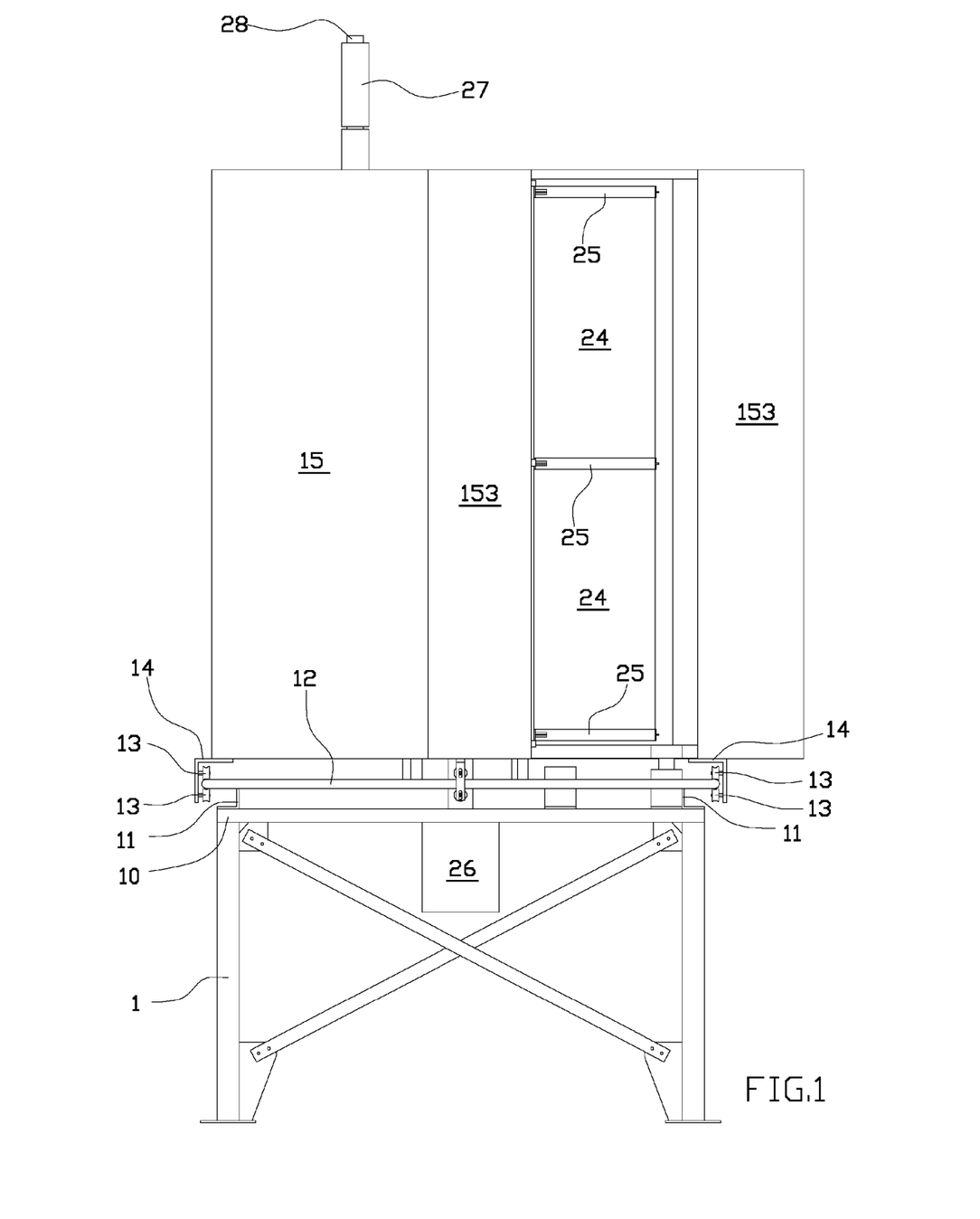
FIG. 1 is a front view of a first embodiment of the invention, from the upwind side.
Figure 2:
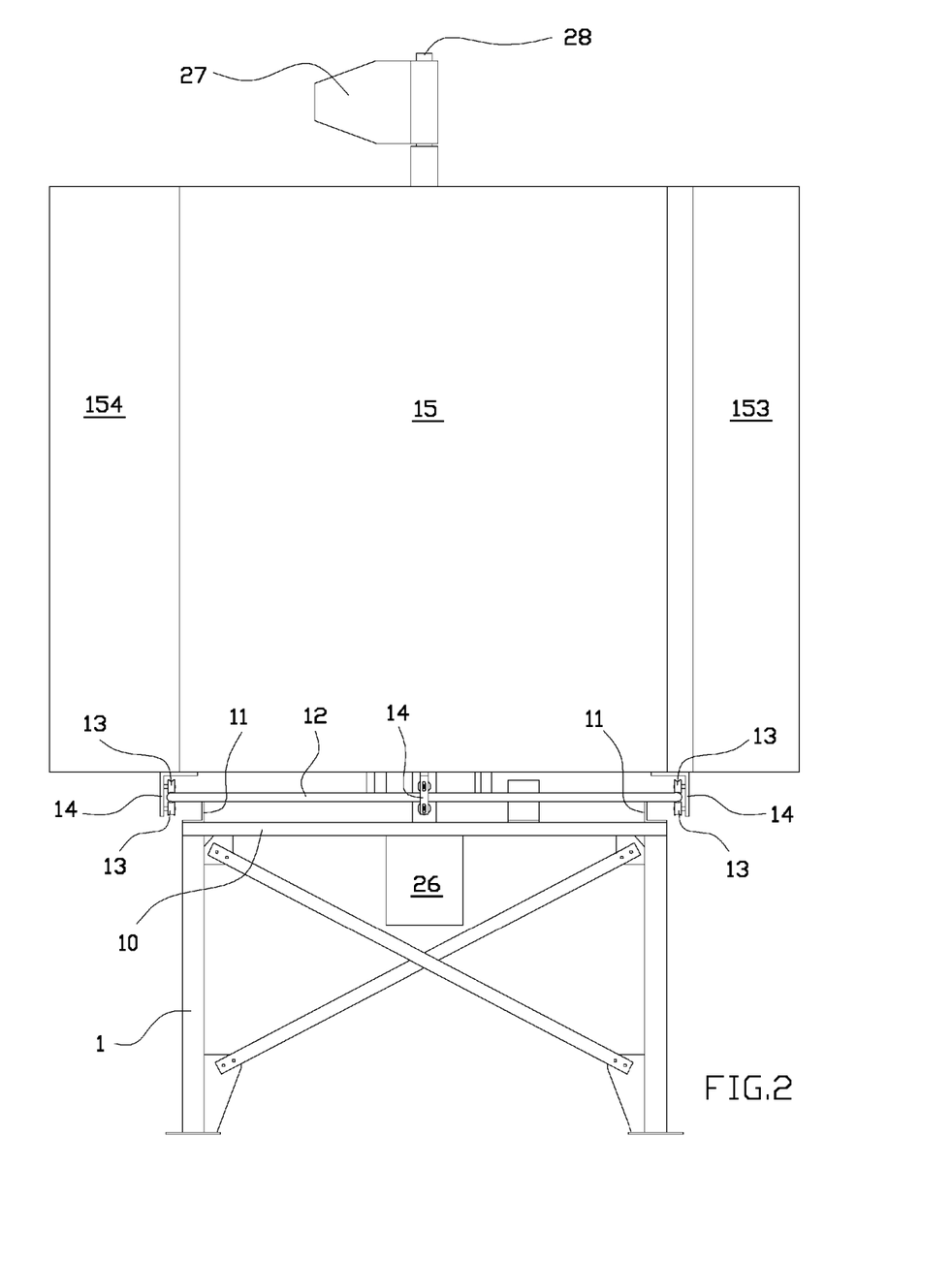
FIG. 2 is a side view of the device of FIG. 1.

A vertically-extending flat vane 27 is supported at the upper end of the casing and is free to rotate about a vertical axis, which vane 27 automatically aligns to the direction of the wind.

The vane 27 rotates freely on a pin 28 solidly associated to the casing 15.

The vane 27 and the casing 15 are connected to reciprocal mobile parts of an encoder device, schematized at 29, of which a reference point, or zero, coincides with the position of the vane 27 orthogonal to the diameter of the casing comprising both the axis of the casing and the axis of the pin 28, i.e. the rotational axis of the vane.

The reference position of the vane coincides with the direction of the wind.

The encoder device controls the motor 18 such as to move the reciprocal positions of the vane 27 and the duct 153 into the reference position.

In this way the duct 153 inlet is always substantially perpendicular to the wind direction.

In the invention the rotor comprised of the blades 24 preferably exhibits an axial dimension of from 2000 mm to 3000 mm, and a diameter of from 2000 mm to 2600 mm; the casing exhibits a diameter and height sufficient to snugly contain the rotor without interference; at the casing 15, the inlet duct 153 is at an angle of about 90° to the casing 15, and also exhibits a flat opening displaced from the casing and at a same height as the casing, with a width of from 1500 mm to 2300 mm, and a length, measured from the diametric plane parallel to the inlet, of from 1500 to 2300 mm; the outlet duct 154 is at an angle of about 90° to the casing 15, and has a flat opening displaced from the casing at a same height as the casing, with a width of from 1000 to 1500 mm, and a length, measured from the diametric plane parallel to the inlet, of from 1500 to 2000 mm.

The invention has been observed to operate with measured wind speeds of around 4 m/sec.

The invention functions as follows.

The encoder located between the vane 27 and the casing 15 activates the motor 18 such as to maintain the inlet opening of the duct 153 always perpendicular to the wind direction.

The wind captured by the duct inlet 153 is conveyed by the duct such that the entire air flow is received by the blade 24 momentarily positioned in front of the opening, causing the rotor to rotate together with the associated generator.

The second embodiment of FIGS. 8 to 11 comprises the same components of the first embodiment, which in the figures are shown with the same numeral references, except for a modified rotor and the shape and dimensions of convergent and divergent ducts.

Figure 6:
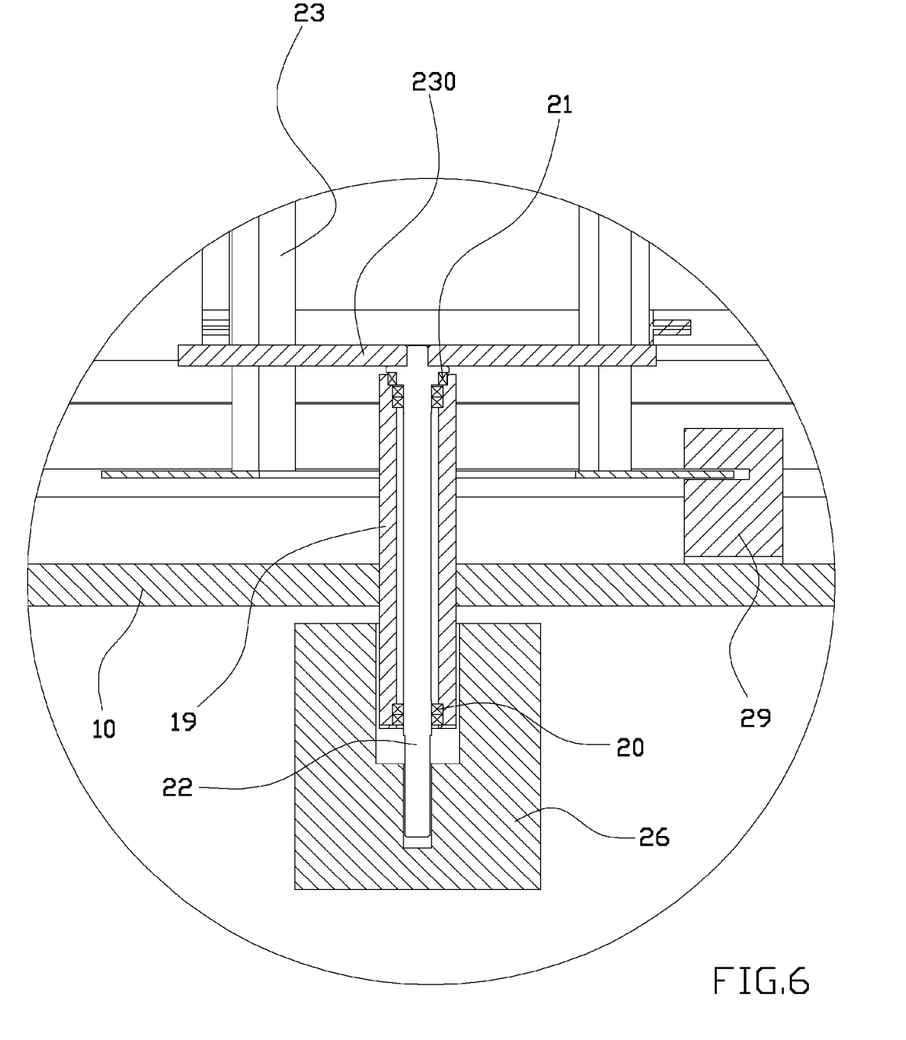
FIG. 6 is an enlarged detail VI of FIG. 4.
Figure 7:
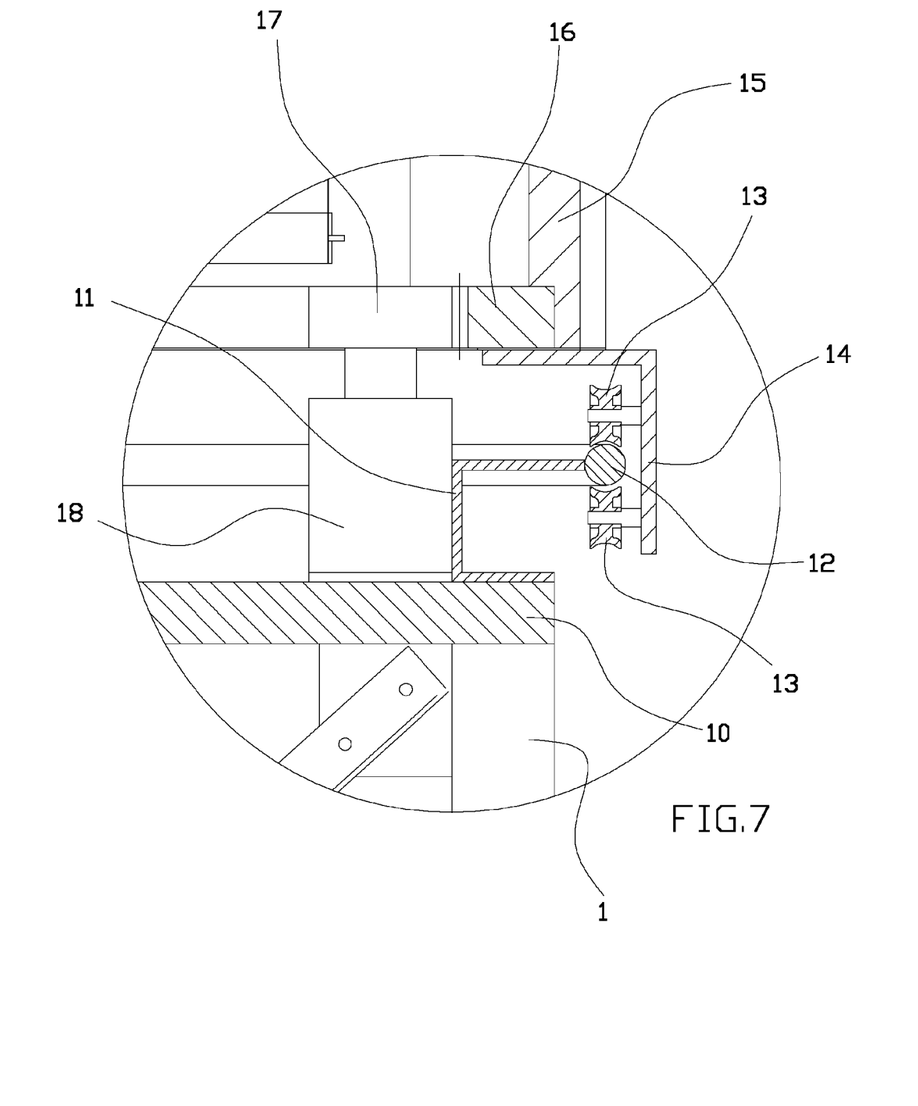
FIG. 7 is an enlarged detail VII of FIG. 4.
Figure 8:
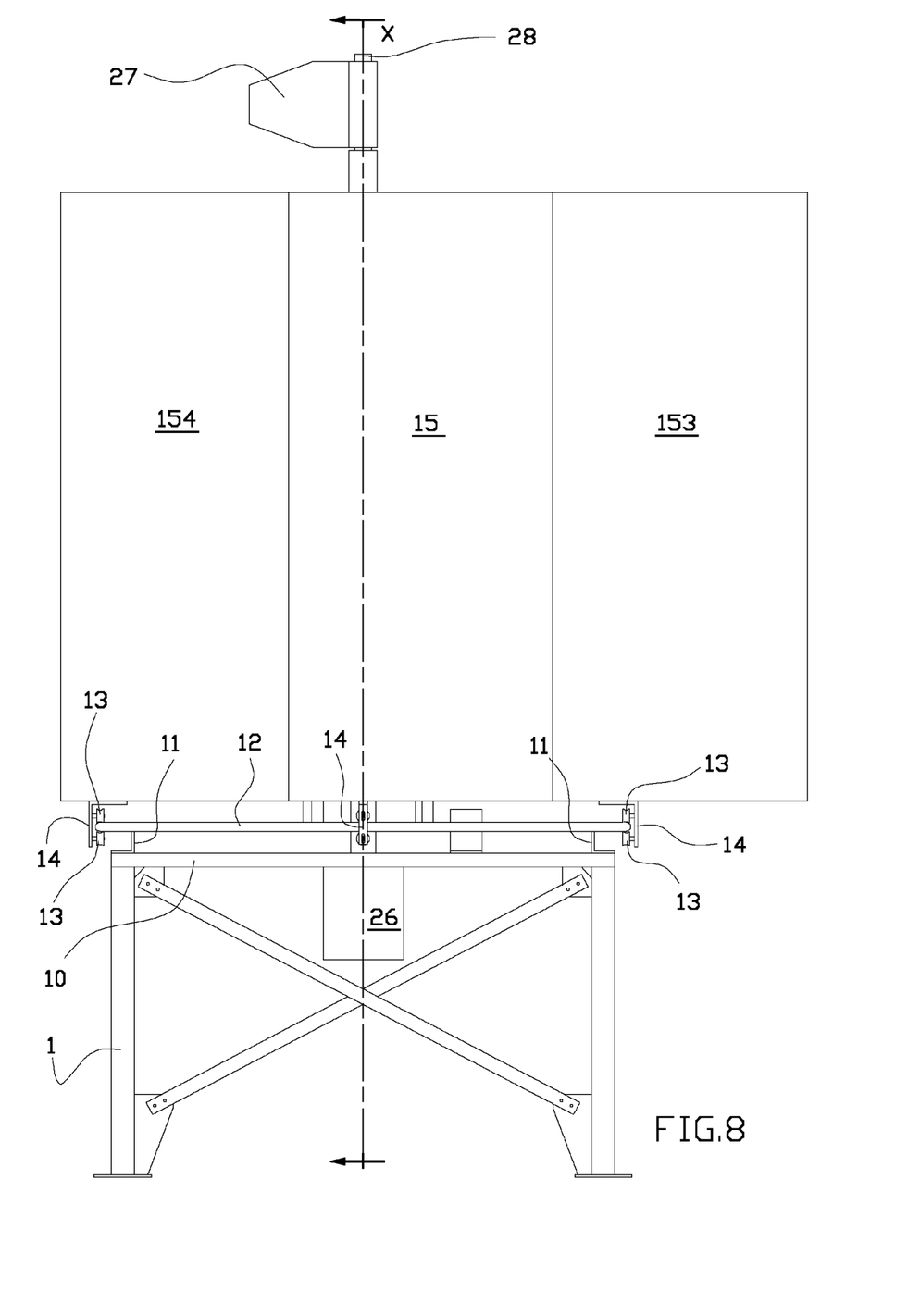
FIG. 8 is the side view of a second embodiment of the invention.
Figure 9:
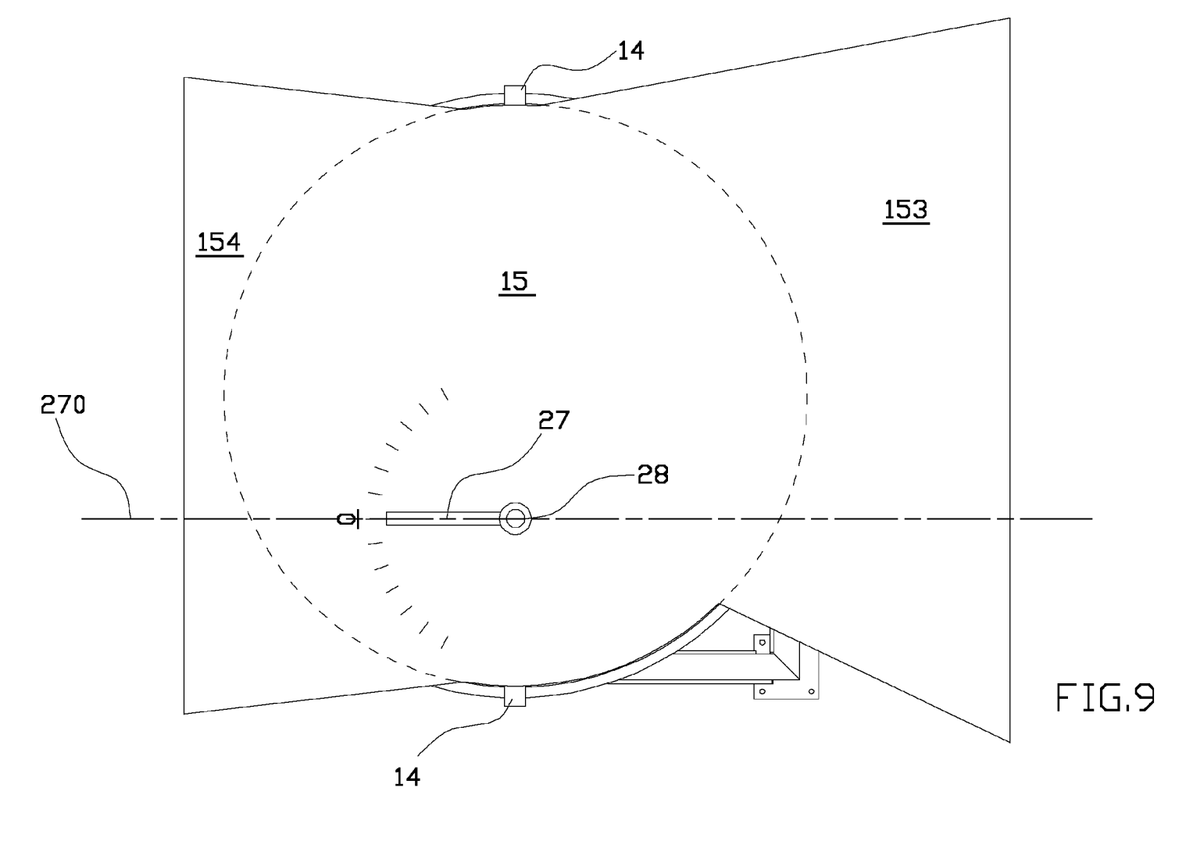
FIG. 9 is the plan view from IX of the device of FIG. 8.

The plate 10 is fitted with a central hub 19 (FIG. 10) which supports a shaft 22 by way of suitable bearings 20 and 21, so as disclosed in the first embodiment (FIGS. 6 and 7).

Figure 10:
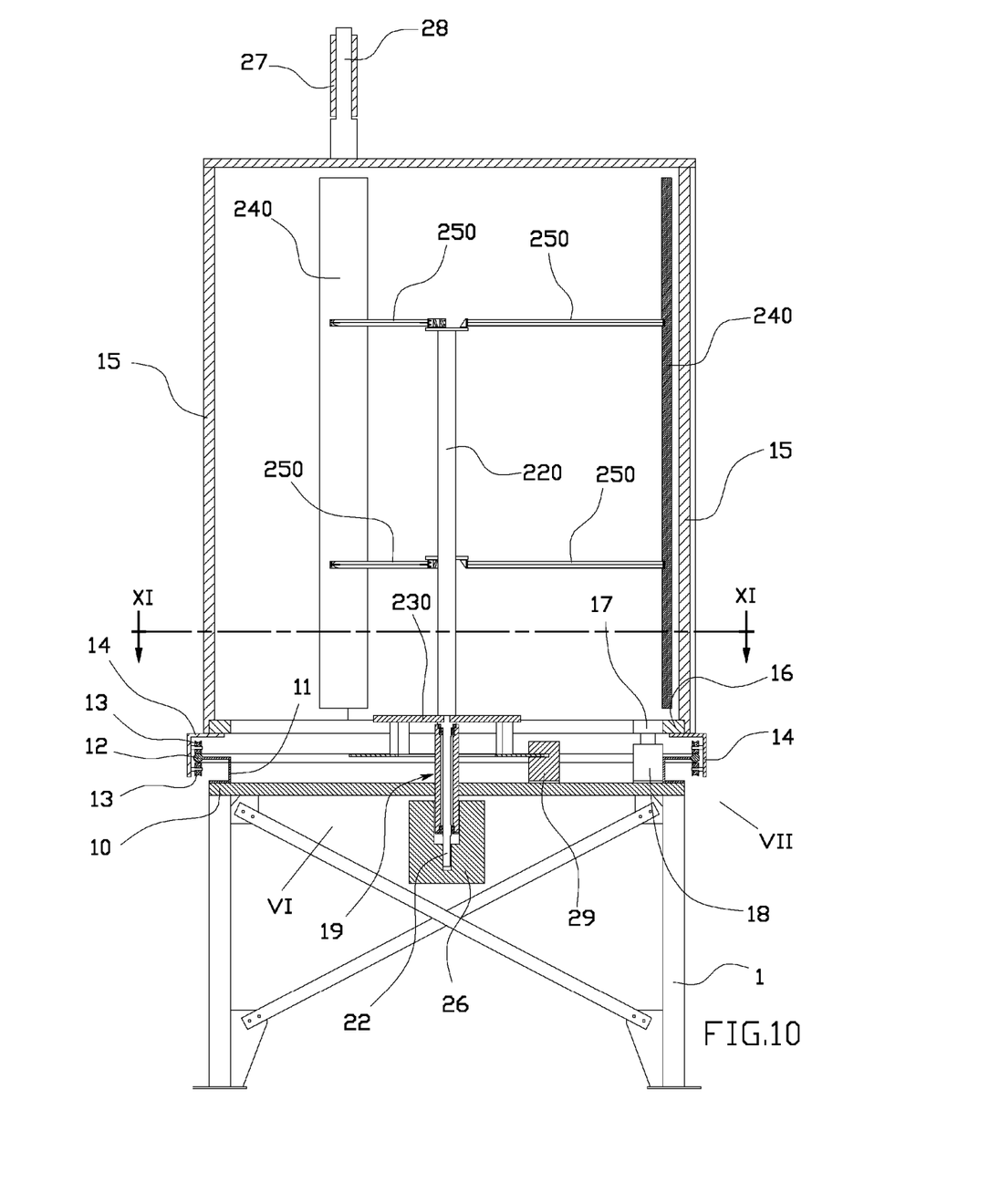
FIG. 10 is the cross-section X-X of FIG. 8.

The shaft 22 supports, above the plate 10, a cylindrical body 220 coaxial with the hub 19, from which three pairs of coplanar arms 250 project radially.

Each pair 250 supports a wing 240 parallel to the external wall of the casing 15, near and substantially parallel thereto.

The cylindrical casing 15 exhibits two openings 151A and 152A (FIG. 11) for the inlet and outlet air flow.

Figure 11:
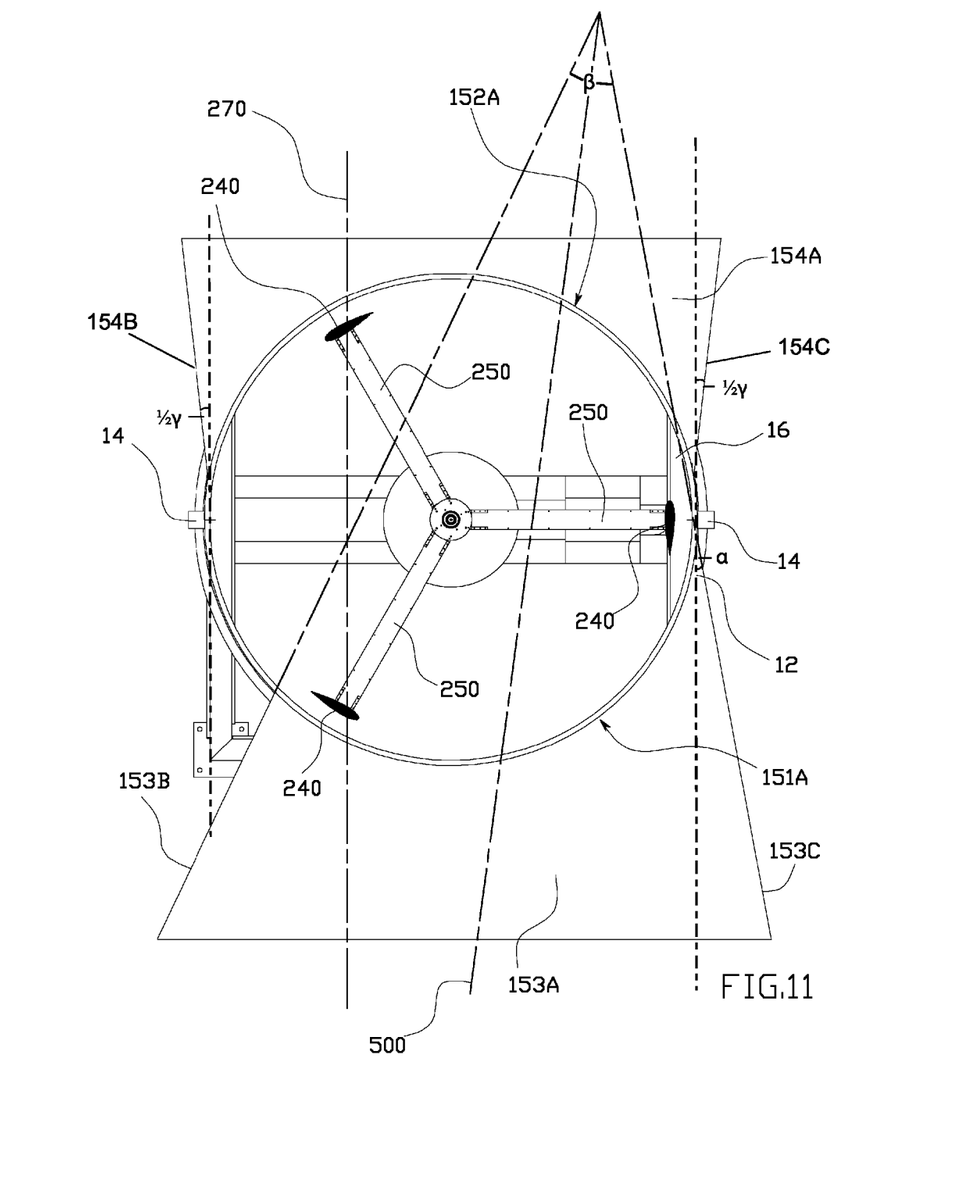
FIG. 11 is the cross section XI-XI of FIG. 9.

The opening 151A is in communication with a convergent duct 153A, while the opening 152A is in communication with a divergent duct 154A.

The projection on the diameter of the opening 151A is larger than the radius of the cylindrical casing 15, and the convergent duct 153A is comprised between two convergent walls 153B and 153C having an angle therebetween of 30° to 45°, preferably of 36°.

More precisely the wall 153C is substantially tangent to the cylindrical casing 15, and inclined to the plane 270 of the vane 27, while in its reference position, of an angle α of 7° to 13°, preferably 10.5°. The wall 153B is inclined to the wall 153C of an angle β of 16 to 27, preferably of 25.5°.

The distance between the inlet end of the convergent duct 153A and the axis of the casing 15 is of 1.5 the diameter of the casing to 1.75 the diameter of the casing, preferably the distance is 1.65 the diameter.

The divergent walls 154B and 154C are symmetrically disposed in respect of the shaft 22, each is substantially tangent to the casing and the angle therebetween is of 11° to 15°, preferably of 13°.

The distance between the outlet end of the divergent duct 154A and the axis of the casing 15 is of 1.0 the diameter of the casing to 1.30 the diameter of the casing, preferably the distance is 1.11 the diameter.

The bisecting plane 500 of the walls 153B and 153C of the convergent duct lies between the axis of the casing 15 and the wall 153C.

The space between the two openings 151 and 152, 151A and 152A is always occupied by at least one of the blades 24, or wings 240.

The invention is not limited to the example described above and variants and improvements could be introduced without exiting from the scope of the following claims.

The invention claimed is:

1. A wind turbine device comprising a base frame supporting a vertical-axis rotor, the axis of the rotor being associated to a generator, wherein the rotor is snugly contained inside a cylindrical casing exhibiting two openings, respectively equipped with an inlet convergent and an outlet divergent duct, the casing being driven in rotation around its axis by a member responsive to a wind direction, such that the inlet convergent duct is always positioned facing the wind, wherein an inlet opening of the convergent duct is larger than the radius of the cylindrical casing, the convergent duct being comprised between two convergent walls in which no plane tangential to any point of one of the convergent walls lies in the same side of the axis of the casing where lies any plane tangential to any point of the other convergent wall, one of said convergent walls being substantially tangent to the casing and the bisecting plane of any plane tangential to any point of one of the convergent walls of the convergent duct lies between the axis of the casing and the wall substantially tangent to the casing.

2. The wind turbine device of claim 1, wherein the convergent wall substantially tangent to the cylindrical casing, is inclined to the wind direction at an angle α of 7° to 13°.

3. The wind turbine device of claim 1, wherein a distance between an end of the convergent duct and axis of the rotor is from 1.5 times the diameter of the casing to 1.75 times the diameter of the casing.

4. The wind turbine device of claim 1, wherein an outlet opening of the divergent duct is comprised between two divergent walls having an angle therebetween of 11° to 15°.

5. The wind turbine device of claim 4, wherein the divergent walls are symmetrically disposed in respect of the axis of the rotor, each being substantially tangent to the casing and the angle therebetween is from 11° to 15°.

6. The wind turbine device of claim 5, wherein the distance between the outlet opening of the divergent duct and the casing axis is from 1.0 times the diameter of the casing to 1.3 times the diameter of the casing.

7. The wind turbine device of claim 5, wherein the divergent walls are symmetrically disposed in respect of the axis of the rotor, each being substantially tangent to the casing and the angle therebetween is 13°.

8. The wind turbine device of claim 1, wherein the member responsive to a wind direction is a flat vane freely rotating about a vertical axis which is solidly constrained to the casing.

9. The wind turbine device of claim 8, wherein the flat vane is connected to a mobile part of an encoder, the other part of which being connected to the casing, the encoder commanding an electric motor which operates the rotations of the casing.

10. The wind turbine device of claim 1, wherein the convergent wall substantially tangent to the cylindrical casing, is inclined to a wind direction at an angle α 10.5°.

* * * * *